United States Patent
Bhamidipati et al.

(10) Patent No.: US 8,700,648 B2
(45) Date of Patent: Apr. 15, 2014

(54) CONTEXT BASED NETWORKING

(75) Inventors: Narayan Lakshmi Bhamidipati, Bangalore (IN); Debajyoti Dutta, Bangalore (IN)

(73) Assignee: Yahoo!, Sunnyvale, CA (US)

(*) Notice: Subject to any disclaimer, the term of this patent is extended or adjusted under 35 U.S.C. 154(b) by 196 days.

(21) Appl. No.: 12/404,345

(22) Filed: Mar. 16, 2009

(65) Prior Publication Data
US 2010/0235389 A1    Sep. 16, 2010

(51) Int. Cl.
*G06F 7/00*      (2006.01)
*G06F 17/30*    (2006.01)

(52) U.S. Cl.
USPC .......................................... 707/758; 707/749

(58) Field of Classification Search
USPC .......... 709/206, 207; 707/708, 718, 728, 769, 707/748, 749, 758, 771
See application file for complete search history.

(56) References Cited

U.S. PATENT DOCUMENTS

| | | | |
|---|---|---|---|
| 7,346,628 B2 * | 3/2008 | Porter ................................... 1/1 |
| 7,693,818 B2 * | 4/2010 | Majumder ............. 707/999.002 |
| 7,716,199 B2 * | 5/2010 | Guha ............................ 707/706 |
| 2003/0182428 A1 * | 9/2003 | Li et al. ......................... 709/227 |
| 2004/0117358 A1 * | 6/2004 | von Kaenel et al. .............. 707/3 |
| 2005/0289140 A1 * | 12/2005 | Ford et al. ......................... 707/5 |
| 2006/0064411 A1 * | 3/2006 | Gross et al. ....................... 707/3 |
| 2007/0203996 A1 * | 8/2007 | Davitz et al. .................. 709/206 |
| 2008/0059508 A1 * | 3/2008 | Lu et al. ........................ 707/102 |
| 2009/0119276 A1 * | 5/2009 | Neron ................................ 707/5 |
| 2010/0169802 A1 * | 7/2010 | Goldstein et al. ............. 715/760 |

\* cited by examiner

*Primary Examiner* — Md. I Uddin
(74) *Attorney, Agent, or Firm* — Evergreen Valley Law Group, P.C.; Kanika Radhakrishnan (57) ABSTRACT

Context based networking. A method for context based networking includes receiving a query. Further, the method includes obtaining behavioral targeting scores of a plurality of first buddy nodes of a node corresponding to the query. Furthermore, the method includes updating the behavioral targeting scores of the plurality of first buddy nodes based on behavioral targeting score of at least one second buddy node of each first buddy node. In addition, the method includes forwarding the query to at least one first buddy node based on the updated behavioral targeting scores. Further, the method includes obtaining a response associated with the query. The method also includes electronically providing the response to a user of the node.

11 Claims, 5 Drawing Sheets

CONTEXT BASED NETWORKING

BACKGROUND

An effective conduit for dissemination and obtaining of information is achieved through direct or personal relationships referred to as social network. A social network includes persons and their personal relationships to other persons. Currently, there exist various social networks for raising multiple queries, exchanging, recommending, and reviewing information amongst peer to peer users. Often, when a user has a query, he selects a person existing in his social network for obtaining a response pertaining to the query. However the task of raising the query and receiving a response from that person requires manual intervention. Further, the task becomes complex when the list of persons existing in the social network increases. In another approach, the user may post his query over websites, for example Yahoo!® Answers, and users visiting such websites may, in turn, post their responses to the queries posted on such websites. However, in this scenario, there is no guarantee of obtaining a response from such websites. In addition, it requires the user to frequently visit the website to check if a response has been posted.

In light of foregoing discussion there is a need for an efficient technique for the context based networking.

SUMMARY

Embodiments of the present disclosure described herein provide an article of manufacture, a computer-implemented method and a system for context based networking.

An example of an article of manufacture includes a machine-readable medium. The machine-readable medium carries instructions operable to cause a programmable processor to perform receiving a query. Further, the machine-readable medium carries instructions operable to cause the programmable processor to perform obtaining behavioral targeting scores of a plurality of first buddy nodes of a node corresponding to the query. Furthermore, the machine-readable medium carries instructions operable to cause the programmable processor to perform updating the behavioral targeting scores of the plurality of first buddy nodes based on behavioral targeting score of at least one second buddy node of each first buddy node. The machine-readable medium carries instructions operable to cause the programmable processor to perform forwarding the query to at least one first buddy node based on the updated behavioral targeting scores and obtaining a response associated with the query. Moreover, the machine-readable medium carries instructions operable to cause the programmable processor to perform electronically providing the response to a user of the node.

An example of a computer-implemented method for context based networking includes receiving a query. Further, the computer-implemented method includes obtaining behavioral targeting scores of a plurality of first buddy nodes of a node corresponding to the query. Furthermore, the computer-implemented method includes updating the behavioral targeting scores of the plurality of first buddy nodes based on behavioral targeting score of at least one second buddy node of each first buddy node. In addition, the computer-implemented method includes forwarding the query to at least one first buddy node based on the updated behavioral targeting scores. Further, computer-implemented method includes obtaining a response associated with the query. The computer-implemented method also includes electronically providing the response to a user of the node.

An example of a system for context based networking includes a user electronic device. Further, the system includes a plurality of buddy electronic devices in electronic communication with the user electronic device. Furthermore, the system includes a communication interface in electronic communication with the user electronic device and the plurality of buddy electronic devices. In addition, the system includes a storage unit for storing instructions. The system includes a processor for executing the instructions, the instructions for obtaining behavioral targeting scores of the plurality of buddy electronic devices in response to a query from the user electronic device, updating the behavioral targeting scores of the plurality of buddy electronic devices based on buddies of the plurality of buddy electronic devices, forwarding the query to at least one buddy electronic device based on the updated behavioral targeting scores, obtaining a response associated with the query and electronically displaying the response on the user electronic device.

DETAILED DESCRIPTION OF THE EMBODIMENTS

Figure 1:
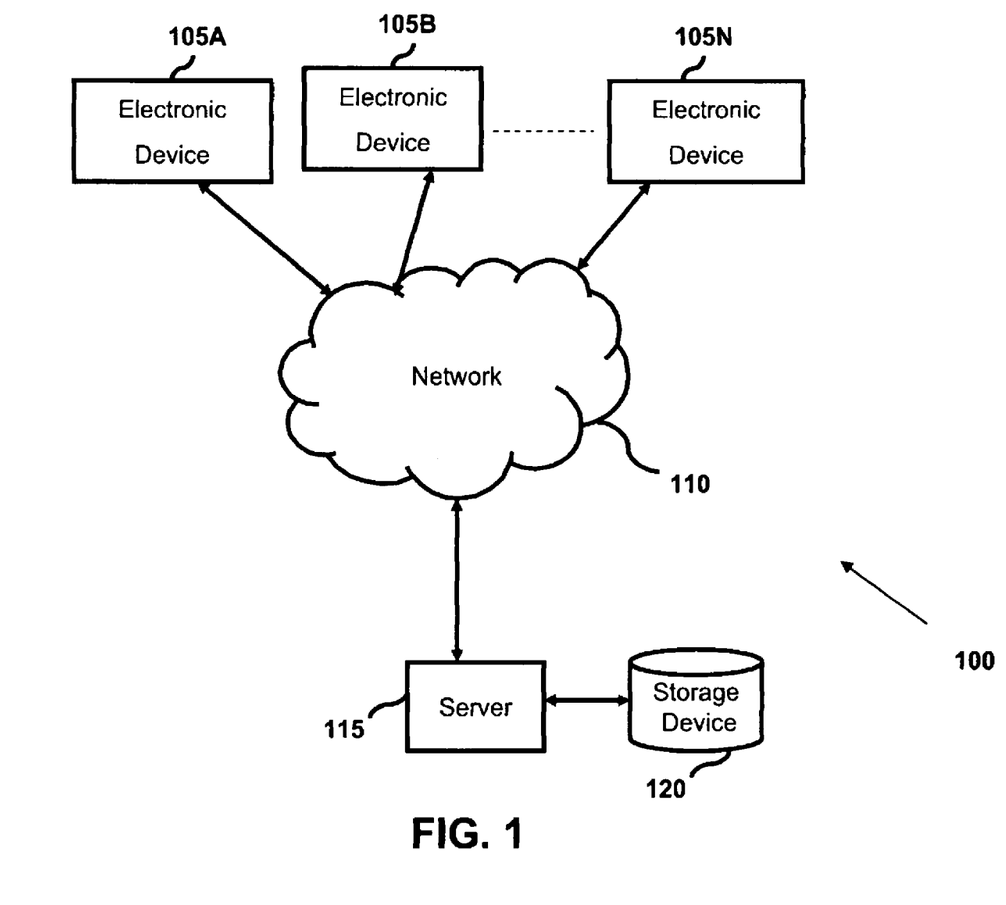
FIG. 1 is a block diagram of an environment, in accordance with which various embodiments can be implemented.

FIG. 1 is a block diagram of an environment 100, in accordance with which various embodiments can be implemented. The environment 100 includes one or more electronic devices, for example an electronic device 105A, an electronic device 105B and an electronic device 105N connected to each other through a network 110. Examples of the one or more electronic devices include, but are not limited to, computers, mobile devices, laptops, palmtops, and personal digital assistants (PDAs). Examples of the network 110 include, but are not limited to, a Local Area Network (LAN), a Wireless Local Area Network (WLAN), a Wide Area Network (WAN), wired network, wireless network, internet and a Small Area Network (SAN). Examples of a protocol used for communication by the one or more electronic devices include, but are not limited to, internet protocol, and wireless application protocol (WAP) and any other protocol applicable for communicating data in the network 110. The one or more electronic devices are connected to a server 115 through the network 110.

A user of the electronic device 105A has an account for social networking on various websites or applications, for example Yahoo!® Messenger or any other social networking website. The account includes a list of contacts. Each contact in the list of contacts can be referred to as a first buddy of the user. The user of the electronic device 105A can communicate with the buddy through the electronic device 105B of the buddy. The electronic device 105A can be referred to as a user electronic device and electronic device 105B can be referred to as a first buddy electronic device. There can be several first buddy electronic devices. Also, there can be several electronic devices, for example the electronic device 105N, corresponding to buddies of the first buddy of the user. A buddy of the first buddy not in direct contact with the user can be referred to as a second buddy of the user and the electronic device of the second buddy can be referred to as a second buddy electronic device.

The user communicates with one or more first buddies through various communication means, for example webcam, an audio-video conference, and chatting. The details of such communications are sent to the server 115. The server 115 uses these details for determining a behavioral targeting score for each first buddy. The behavioral targeting score can be defined as a score assigned to a buddy based on relevance of that buddy for the user. The behavioral targeting scores can be calculated for each category for a buddy. Examples of the one or more categories include, but are not limited to, sports, finances, stocks, shares, Electronic commerce, entertainments, digital devices, pharmaceutical, automobiles, travelling, hot jobs, and education. The behavioral targeting score can be based on various other factors, for example web usage history of buddy. The behavioral targeting score also signifies the relevance of a buddy for a particular category, for example if the behavioral targeting score of the first buddy using electronic device 105B is higher than that of a buddy using electronic device 105C then this signifies that the first buddy using electronic device 105B performs higher internet activity in stocks category as compared to the first buddy using electronic device 105C. The behavioral targeting scores can be updated based on the communication of the first buddies with the second buddies. The behavioral targeting scores are stored in a storage device 120.

The user can post or send a query to the first buddy through the electronic device 105A. The server 115 receives the query. Based on the query, it query can be associated with n various categories. The categories can be identified by the electronic device 105A. In some embodiments, the server 115 can identify the categories. The server 115 then forwards the query to the first buddy electronic devices or to the electronic devices of the buddies of first buddies of the user based on the behavioral targeting scores of a buddy of each electronic device. The server 115 obtains responses for the query and displays the responses on the electronic device 105A.

The server 115 includes a plurality of elements for performing various functions. The server 115 including the elements is explained in detail in FIG. 2.

Figure 2:
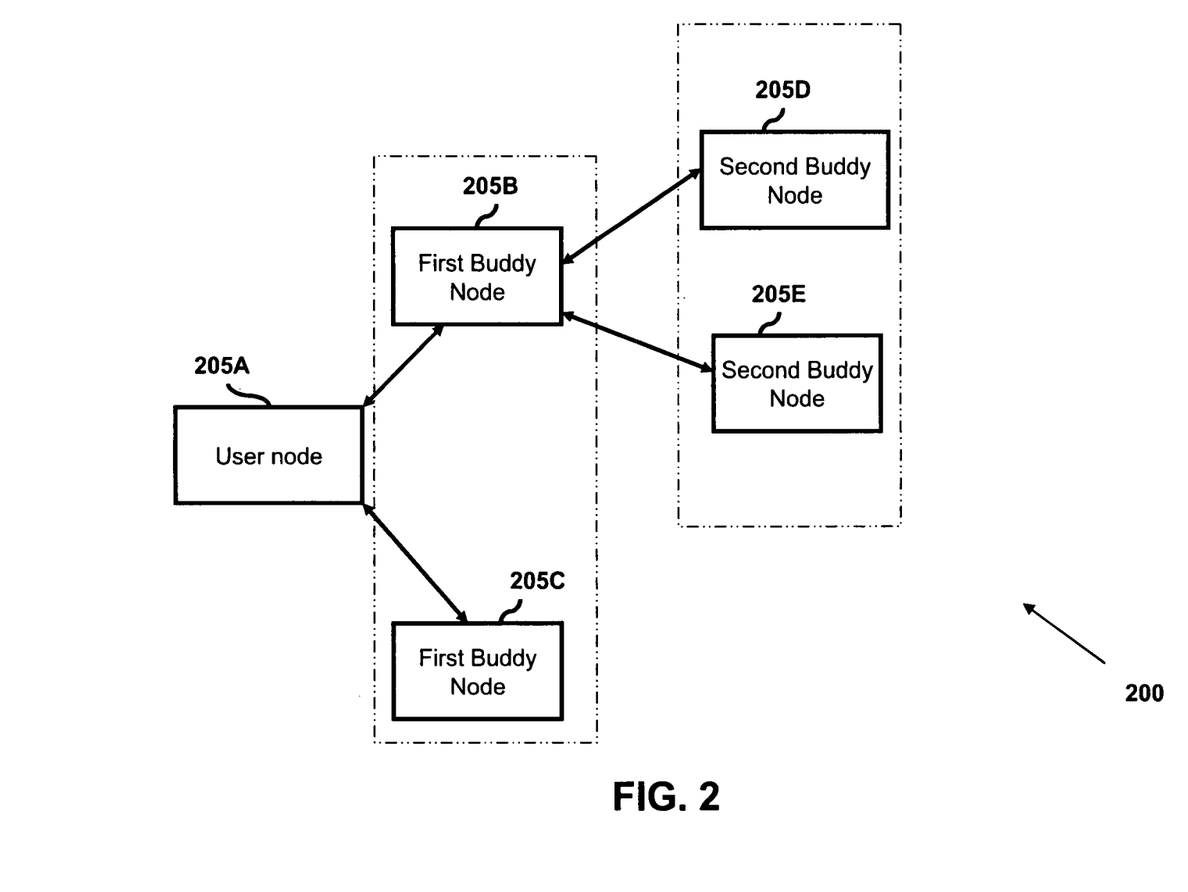
FIG. 2 is a block diagram of a buddy network, in accordance with one embodiment.

FIG. 2 is a block diagram of a buddy network, in accordance with one embodiment.

The buddy network is used for context based networking. The buddy network includes a user node 205A, for example a user of a Yahoo!® Messenger, connected to a first buddy node 205B and the first buddy node 205C. The first buddy nodes can be defined as nodes corresponding to the users who are in direct contact with the user. For example, the first buddy nodes in Yahoo!® Messenger can include the list of contacts present in the account of the user.

The first buddy nodes can have their own buddy nodes. For example, the first buddy node 205B can be communicating with a second buddy node 205D and the second buddy node 205E. The second buddy nodes can be defined as nodes corresponding to the users who are not in direct contact with the user but in direct contact with the users of the first buddy nodes. For the user node 205A, the first buddy nodes forms a neighborhood of degree zero and the second buddy nodes form a neighborhood of degree one.

It will be appreciated that the buddy network can be extended beyond neighborhood of degree one. The third buddy nodes with a neighborhood degree of two can also be considered. Each buddy node communicates using an electronic device.

Figure 3:
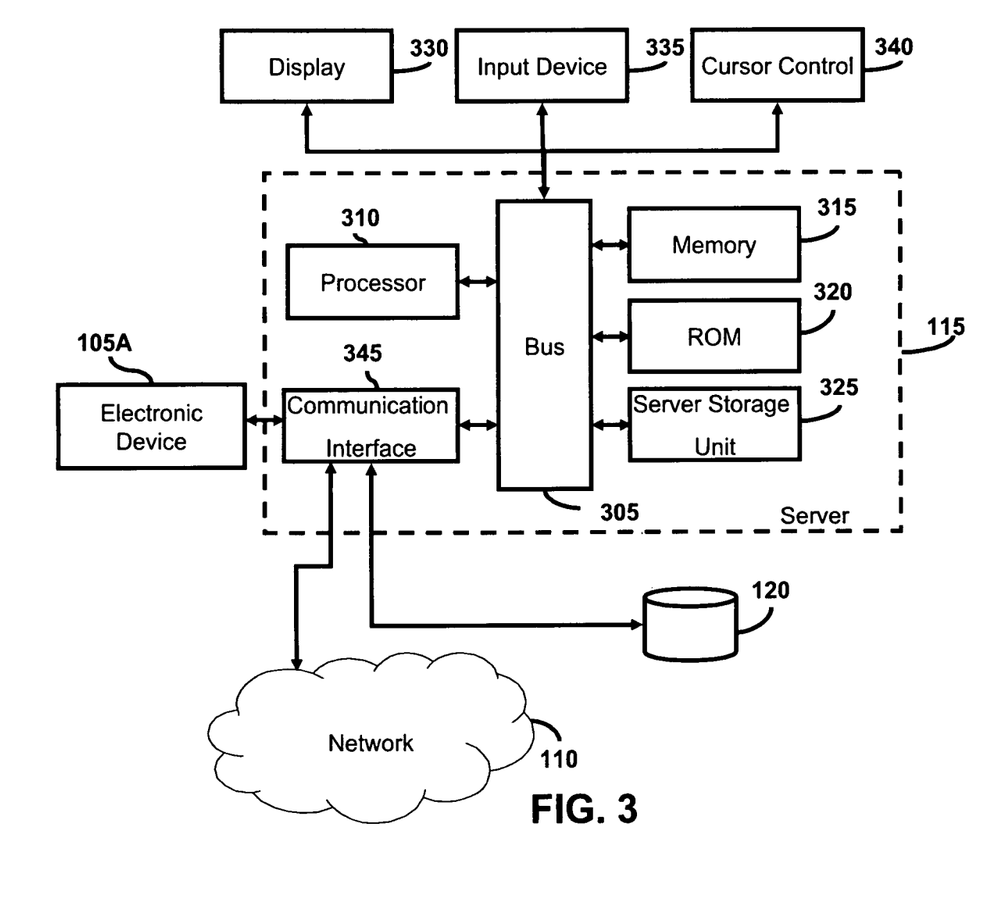
FIG. 3 is a block diagram of the server, in accordance with one embodiment.

FIG. 3 is a block diagram of the server 115, in accordance with one embodiment. The server 115 includes a bus 305 for communicating information, and a processor 310 coupled with the bus 305 for processing information. The server 115 also includes a memory 315, for example a random access memory (RAM) coupled to the bus 305 for storing instructions to be executed by the processor 310. The memory 315 can be used for storing temporary information required by the processor 310. The server 115 further includes a read only memory (ROM) 320 coupled to the bus 305 for storing static information and instructions for the processor 310. A server storage unit 325, for example a magnetic disk, hard disk or optical disk, can be provided and coupled to bus 305 for storing information and instructions.

The server 115 can be coupled via the bus 305 to a display 330, for example a cathode ray tube (CRT) or liquid crystal display (LCD), for displaying information. An input device 335, including various keys, is coupled to the bus 305 for communicating information and command selections to the processor 310. In some embodiments, cursor control 340, for example a mouse, a trackball, a joystick, or cursor direction keys for command selections to the processor 310 and for controlling cursor movement on the display 330 can also be present.

In one embodiment, the steps of the present disclosure are performed by the server 115 in response to the processor 310 executing instructions included in the memory 315. The instructions can be read into the memory 315 from a machine-readable medium, for example the server storage unit 325. In alternative embodiments, hard-wired circuitry can be used in place of or in combination with software instructions to implement various embodiments.

The term machine-readable medium can be defined as a medium providing data to a machine to enable the machine to perform a specific function. The machine-readable medium can be a storage media. Storage media can include non-volatile media and volatile media. The server storage unit 325 can be a non-volatile media. The memory 315 can be a volatile media. All such media must be tangible to enable the instructions carried by the media to be detected by a physical mechanism that reads the instructions into the machine.

Examples of the machine readable medium includes, but are not limited to, a floppy disk, a flexible disk, hard disk, magnetic tape, a CD-ROM, optical disk, punchcards, paper-tape, a RAM, a PROM, EPROM, and a FLASH-EPROM.

The machine readable medium can also include online links, download links, and installation links providing the instructions to be executed by the processor 310.

The server 115 also includes a communication interface 345 coupled to the bus 305 for enabling data communication. Examples of the communication interface 345 include, but are not limited to, an integrated services digital network (ISDN) card, a modem, a local area network (LAN) card, an infrared port, a Bluetooth port, a zigbee port, and a wireless port.

The processor 310 receives a query from the electronic device 105A through the communication interface 345. The electronic device 105A is connected to a plurality of first buddy electronic devices in the neighborhood of degree zero and one or more second electronic devices in the neighborhood of degree one. The processor 310 also receives the one or more categories corresponding to the query from the user node 205A. In some embodiments, the processor 310 can identify the categories if the categories are not received.

The processor 310 obtains the behavioral targeting scores for the first buddy electronic devices and the second buddy electronic devices from the storage device 120. The processor 310 updates the behavioral targeting scores of the first buddy electronic devices based on the behavioral targeting scores of the second buddy electronic devices. The processor 310 forwards the query to the first buddy electronic devices based on the updated behavioral targeting scores, obtains response from the query and provides the response to the electronic device 105A.

In some embodiments, the processor 310 can include one or more processing units for performing one or more functions of the processor 310. The processing units are hardware circuitry performing specified functions.

Figure 4:
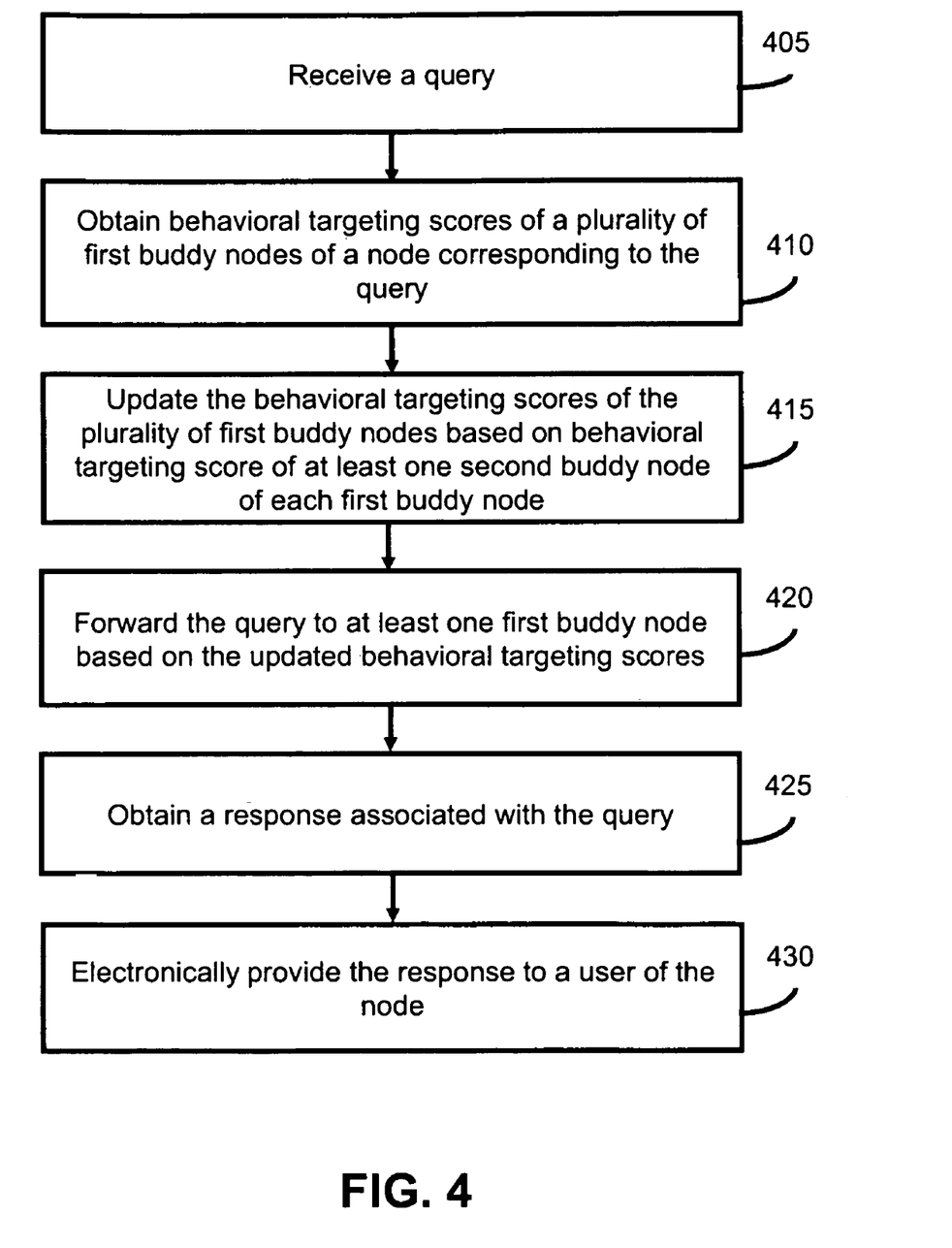
FIG. 4 is a flowchart illustrating a method for context based networking, in accordance with one embodiment.

FIG. 4 is a flowchart illustrating a method for context based networking, in accordance with one embodiment.

At step 405, a query, for example "which is the best car?" is received from a node. The node corresponds to a user of a social networking website or application. The user has a buddy network. For example, a user of Yahoo!® Messenger has list of contacts forming the buddy network. The query is a combination of one or more words. The user can post or insert a query in a query box provided in the application interface. One or more categories corresponding to the query can also be received from an electronic device of the user. Examples of the categories include, but are not limited to, sports, finances, stocks, shares, Electronic commerce, entertainments, digital devices, pharmaceutical, automobiles, traveling, hot jobs, and education. The categories can be identified using various query categorization techniques. Examples of the query categorization techniques include, but are not limited to, the query categorization technique provided in the publication titled "*Automatic web query classification using labeled and unlabeled training data*", Sources: *Proceedings of the 28th annual international ACM SIGIR conference on Research and development in information retrieval table of contents*, Salvador, Brazil, POSTER SESSION: *Posters table of contents*, Pages: 581-582, Year of Publication: 2005, Authors: Steven M. Beitzel, Eric C. Jensen, Ophir Frieder, David Grossman, David D. Lewis, Abdur Chowdhury, Aleksandr Kolcz; the query categorization technique provided in the publication titled "*Categorizing web queries according to geographical locality*", Source: *Proceedings of the twelfth international conference on Information and knowledge management table of contents*, New Orleans, La., USA, SESSION: Information retrieval session 6: categorization table of contents, Pages: 325-333, Year of Publication: 2003, Authors: Luis Gravano, Vasileios Hatzivassiloglou, Richard Lichtenstein, and the query categorization technique provided in the publication titled "*Automatic classification of Web queries using very large unlabeled query logs*", Source: *ACM Transactions on Information Systems* (*TOIS*) *archive*, Volume 25, Issue 2 (April 2007) table of contents, Article No. 9, Year of Publication: 2007, Authors: Steven M. Beitzel, Eric C. Jensen, David D. Lewis, Abdur Chowdhury, Ophir Frieder, which are incorporated herein by reference.

Further, the categories can also be identified using one or more exemplary techniques explained in details below:
Technique 1:

The query is categorized based on a faceted classification scheme. The faceted classification scheme may include one or more facets. Each facet of the one or more facets is assigned a discrete value. Based on the value an actionable strategy is performed on the classification by search engines. Further, a combined classification of the one or more facets can yield the information to search users.

Examples of the one or more facets include, but are not limited to, ambiguity, authority sensitivity, temporal sensitivity and spatial sensitivity.

Ambiguity (Am) may include a Polysemous query, General query, and Specific query. A query is polysemous when there is more than one strong sense of a query in retrieving results. For example, single work homophones, acronyms or common person names such as "mustang", "ui", "j brown" are polysemous. Further, a query is general when there is only one strong sense but relevant information may be present in other subcategories that may not correlate with each other. For example, "health" can correspond to distinct subcategories like health industry, health advice or health experts. Furthermore, all other queries are specific. Specific queries have a coherent set of relevant information. For example, product queries such as "apple iphone" are specific queries as information on specifications, product availability and price are usually found in specific categories of web pages.

Authority Sensitivity (Au): Queries that require an authoritative, trusted answer are marked as sensitive to authority. For example "virus scans software". Further, all navigational queries are ones that require authoritative results, as their intention is to go directly to the genuine website of interest.

Temporal Sensitivity (T): Queries that return different results issued at different times are marked as temporally sensitive. The results may vary with the scope of the time period (year, month, and day). For example, "us president" is temporally sensitive due to changing results. Similarly, "us president 1956" is not temporal sensitive as it indicates a specific time period.

Spatial Sensitivity (S): Queries that return results that account for the user's location are spatially sensitive. The queries may be sensitive to the user's general region (city, country) or be sensitive to the user's exact location in the case of queries from mobile clients (such as "pizza", "nearest hotel"), relating more to commodities and services in M-commerce.

In one embodiment, the one or more facets may be combined since all facets are discrete with a limited set of 3×2×2×2=24 possible facet combinations, to which we can assign queries. Each such combination is defined as a bin. For example, one bin contains all the queries that possess the combination of facet settings Ambiguity=Specific, Authority sensitivity=No, Temporal sensitivity=Yes, Spatial sensitivity=No. For convenience, bins are referred by an ordered 4-tuple <Am, Au, T, S>.

The resulting classification of the query associated with the one or more facets can be tied with actionable strategy that search engines can invoke directly. For polysemous queries the actionable strategy requires query disambiguation or reformulation as commonly seen in commercialized search engines. General queries span across multiple different subjects, and thus require either relevance feedback to adjust the categorization of subjects for users to choose. For queries that are authority sensitive the actionable strategy requires need information from trusted sources, and need to provide users a quick way to access the authoritative information. For examples, queries looking for an authoritative fact should be served directly with the extracted fact, as well as the information source where the information is quoted, while navigational queries need to have quick access the website addresses. For temporally sensitive queries the actionable strategy requires reflect the users' needs to capture temporally changing results, thus search engines should handle the flow of information over time. First, the window of recency can be inferred from the time frame of the temporal sensitivity (for example, most recent year, month, date), so query "US president" should have a time window of year (or longer) period, while news queries possibly change by dates. Upon determining this, search engines may present recently indexed data and archived data depending on users' interests. RSS technology may enable search engines to capture fresh data pushed from the publishing sites. For spatially sensitive queries, the actionable strategy requires like temporal ones, would need to reweight results to favor resources highly ranked for the locality of the user. Other alternative results with regards to locality can also be presented. By handling the one or more facets by suitable strategies, the improved search engines would be able to adapt to users' intents more effectively.

Technique 2:

The query categorization technique uses SmartCat technology, which is a Support Vector Machine (SVM)-based query categorizer. For an input query, the best match in a given taxonomy is obtained. For example, given the query "Britney spears" and the Bazooka taxonomy, SmartCat identifies the query to be under the 'Entertainment/Music/Pop' category.

In some embodiments, the query can be categorized if the categories are not received from the electronic device. For example, the query "which is the best car?" can be categorized into Auto category.

It will be appreciated that the query can be associated with multiple categories. For example, "what is the best auto finance deal?" can be associated with Auto and Finance categories.

At step 410, the behavioral targeting scores of a plurality of first buddy nodes of the node are obtained. A first buddy node can have different behavioral targeting scores for different categories. The behavioral targeting score signifies relevance of a first buddy node to the user in a category. The behavioral targeting scores for the identified categories are obtained and the "behavioral targeting score" hereinafter refers to the behavioral targeting score for the identified category.

The behavioral targeting scores can be obtained from a database or can be calculated based on details obtained from the database. The details required for calculating the behavioral targeting scores include web usage history of the first buddy node. When a user visits a web page, for example Yahoo!® Search Marketing, the web server, for example Internet Explorer, tracks the user through the browser cookie. All the past activities of the user can be extracted from the web logs corresponding to that user's cookie. Examples of the activities that are taken from the user browser cookie activity logs include, but are not limited to, queries that were searched, links clicked in the search result, sponsored link clicks, display ad views, display ad clicks, and pages viewed.

The behavioral targeting scores are determined using various techniques, wherein weighted combinations of different metrics observed from the historical behavior of the first buddy are computed. One such technique is Direct Response Model which is elucidated below:

Behavioral Targeting Score=I+R+P, where $$I=\text{Intensity Score}=\text{Summation}(iw(e)*(fn(DI(e,n))+d*AI(e,n-1)))$$

Summation is taken over all the events 'e'
iw(e)=intensity weight for event 'e'
DI(e,n)=Daily Intensity for event 'e' for day 'n'
fn( )=Saturation function. Applies an upper bound on daily intensities.
d=decay (=0.99)
AI(e,n−1)=Aggregated Intensity for event 'e' for day 'n−1'

$$R=\text{Recency Score}=\text{Summation}(rw(e)*R(e,n))$$

Summation is taken over all the events 'e'
rw(e)=Recency weight for event 'e'

R(e,n)=Recency value for event 'e' for day 'n'

$$P=\text{Intercept}=A \text{ constant}$$

$$eCTR(\text{expected } CTR)=(k0+k1*ds+k2*ds^2)$$

k0, k1, k2 are constants
ds=score<minscore ? 0: score—minscore

The coefficients, such as intensity weights, recency weights, intercepts k0, k1, k2, and minscore are calculated for each category using a sample set of Yahoo!® users. The past (AI), present (DI) and future (actual CTR) activity is input to the model which applies linear regression to find the constants so that calculated eCTR is very close to actual CTR for the sample users. The modeling can be done separately for each category to make constants differ for different categories.

At step 415, the behavioral targeting scores of the plurality of first buddy nodes are updated based on behavioral targeting score of at least one second buddy node of each first buddy node. The updated behavioral targeting score for a first buddy node is the revised behavioral targeting score determined based on the behavioral targeting scores of the buddies of the first buddy node.

One or more parameters are used for calculating the updated behavioral targeting scores. Example of the parameters include but are not limited to, volume and recency of communication between the user node and the first buddy node, similarity measures between the user node and the first buddy node, volume and recency of communication between the first buddy node and buddies of the first buddy node, and similarity measures between the first buddy node and the buddies of the first buddy node.

For example, a first buddy node XYZ has three buddies A, B, and C, and that the volumes of messages exchanged with them are 10, 10, and 20, respectively. The behavioral targeting score for Autos, on a scale of 0 to 10, for each is as follows: 3.5 for XYZ, 4.8 for A, 2.4 for B, and 3.2 for C. The updated behavioral targeting score can be computed as the sum of the first buddy's behavioral targeting score and a weighted sum of the behavioral targeting scores of the buddies, where the weights are proportional to the volumes of messages exchanged. The revised behavioral targeting score can be computed for the XYZ as 3.5+(10/40)*4.8+(10/40)*2.4+(20/40)*3.2=6.9. Further, more the number of buddies, higher the behavioral targeting score, and higher is the updated behavioral targeting score for the first buddy. The calculation for the updated behavioral targeting scores is applied to each first buddy.

In some embodiments, the behavioral targeting scores may be normalized to meet certain constraints about maximum, minimum, and sum of the scores of all first buddies. Also, the time when these messages were exchanged may be considered. For example if the messages between XYZ and A, B, and C were exchanged today, yesterday, and the day before that, respectively, then the weights can be halved for every passing day. The behavioral targeting score can then be modified to 3.5+(10/40)*4.8+((10/40)/2)*2.4+((20/40)/4)*3.2=5.4. The number of messages may be counted for the particular category.

In some embodiments, the behavioral targeting scores can also be updated based on temporary or physical location of the first buddy, profile of the first buddy, temporary or physical location of a buddy of the first buddy, or profile of the buddy of the first buddy. The physical location can be determined using hardware such as GPS device. For example, if the query is located to a particular location and the first buddy is present in that location then a higher weighted score can be assigned to such first buddy. Similarly, other external or internal devices, buddy which can be used in conjunction with the social networking application can be used for updating the behavioral targeting score of the first buddy.

In some embodiments, the updated behavioral targeting scores can be calculated offline and stored in the storage device.

At step 420, the query is forwarded to the at least one first buddy node based on the updated behavioral targeting scores.

In some embodiments, the updated behavioral targeting scores may be filtered and the query is forwarded to the first buddy node based on the filtering. For example, the updated behavioral targeting score for A is 7, B is 5 and C is 7.2 for the query category "Autos" then B can be filtered and query can be forwarded to A and C only.

In some embodiments, the plurality of first buddy nodes is prioritized based on the updated behavioral targeting scores. Further, the query is forwarded to the at least one first buddy node based on the prioritization.

In some embodiments, options can be provided to the user to select first buddies and prioritize them over the first buddies determined based on the updated behavioral targeting scores.

In case where the first buddy has high behavioral targeting score due to major contributions from a buddy of the first buddy node then the first buddy node sends the query to the buddy of the first buddy node.

At step 425, a response associated with the query is obtained from the at least one first buddy node, for example the first buddy node C. The first buddy node can also obtain this response from its buddy.

At step 430, the response is electronically provided to the user. The response can be displayed to the user in the messenger box or can be sent as an email or as a text message using SMS.

In some embodiments, for subsequent queries the updated behavioral targeting scores may be modified based on the usage history of the user. For example, if the user views responses from a particular first buddy and trusts this first buddy then an additional weightage can be given to this first buddy.

In some embodiments, if the user views the responses obtained from a particular second buddy not in direct contact with the user then the second buddy can be recommended to the user. A connection path may be specified along with recommendation to avoid spamming.

Figure 5:
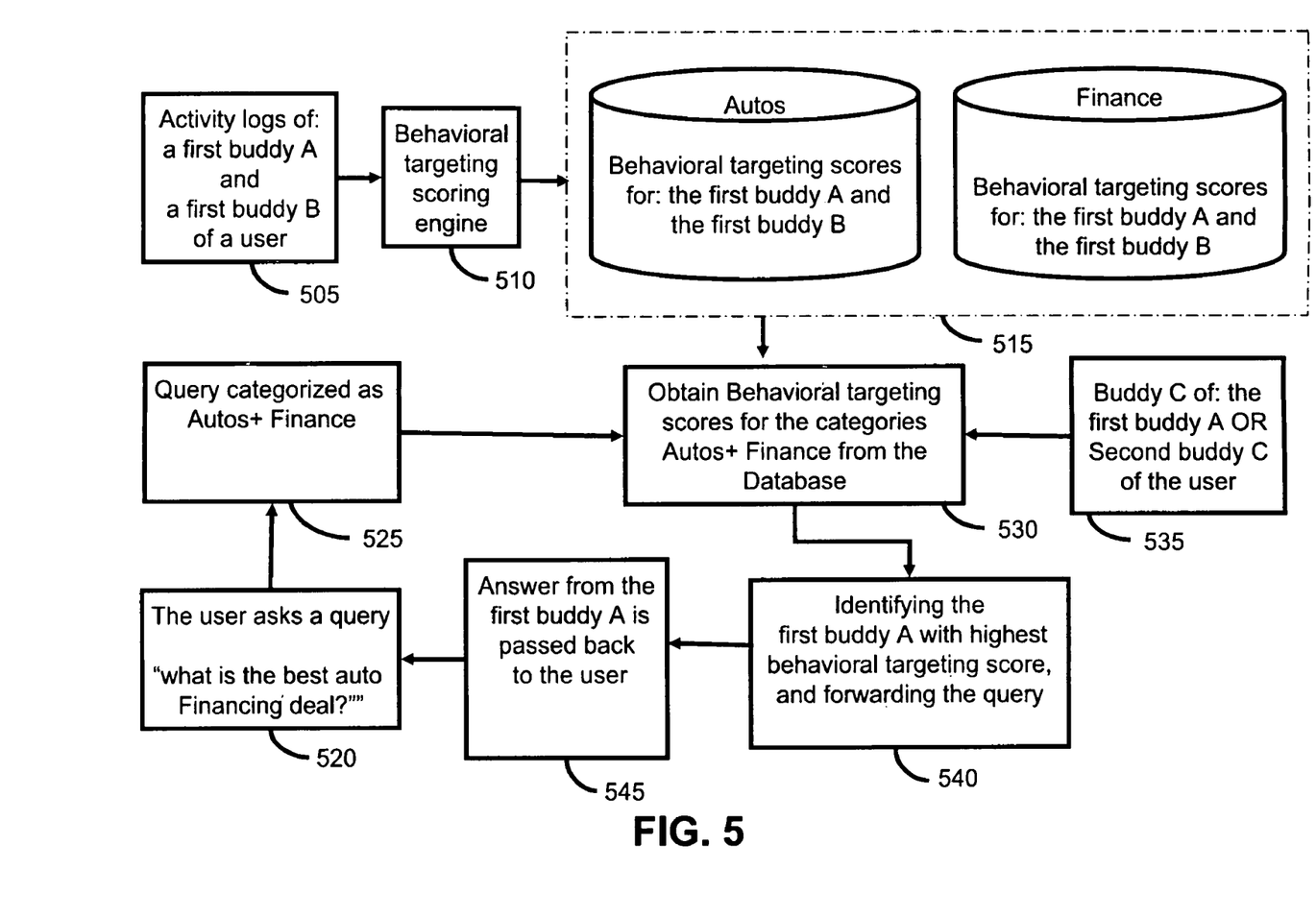
FIG. 5 is an exemplary flow diagram for context based networking, in accordance with one embodiment.

FIG. 5 is an exemplary flow diagram for the context based networking, in accordance with one embodiment.

At step 505, activity logs of a user, a first buddy A of the user and a first buddy B of the user are tracked. For example, the first buddy A performs the activity of searching the best auto deal. The web server tracks the first buddy A through the browser cookie sent by the web browser. All the past activity of the first buddy A can be extracted from the web logs corresponding to the first buddy A's cookie.

At step 510, a behavioral targeting engine calculates the behavioral targeting scores of the first buddy A and the first buddy B for each category based on the activities of the first buddy A and the first buddy B in the each category.

At step 515, the behavioral targeting scores of the first buddy A and the first buddy B are stored in the database under respective categories.

At step 520, the user sends a query "what is the best auto financing deal?".

At step 525, the query is identified into the categories of autos and finance. The context of the query is identified.

At step 530, the behavioral targeting scores for the categories autos and finance for the first buddy A and the first buddy B are obtained from the database.

At step 535, the behavioral targeting scores for the first buddy A are revised based on the behavioral targeting scores of buddy C of the first buddy A for autos and finance categories.

At step 540, the query is forwarded to the first buddy A as the first buddy A has highest behavioral targeting score. The query may optionally be forwarded to the second buddy C of the user by the first buddy A if the second buddy C has major contribution in the behavioral targeting score of the first buddy A.

At step 545, the response from the first buddy A or the second buddy C is obtained.

The response is then provided to the user.

In some embodiments, if no response is obtained then the query can be sent to the first buddy B.

Various embodiments provide context based networking by identifying context of the query and forwarding the query to relevant buddy for obtaining a response to the query. The manual intervention is minimized by identifying relevant buddy based on behavioral targeting scores of buddies of neighborhood degree zero and neighbor degree one While exemplary embodiments of the present disclosure have been disclosed, the present disclosure may be practiced in other ways. Various modifications and enhancements may be made without departing from the scope of the present disclosure. The present disclosure is to be limited only by the claims.

What is claimed is:

1. An article of manufacture comprising:
   a non-transitory machine-readable medium; and
   instructions carried by the medium and operable to cause a programmable processor to perform:
   receiving a query for nodes in a social network;
   identifying characteristics of the query, the characteristics including ambiguity, temporal sensitivity, and spatial sensitivity, and further including authority sensitivity for other than navigational queries;
   obtaining behavioral targeting scores of a plurality of first buddy nodes of a node corresponding to the query, wherein the behavioral targeting scores are calculated based on weighted combinations of different metrics observed from historical behavior of the first buddy node, where the behavioral targeting score=I+R+P, where:
   (i) I is an intensity score based on intensity weights of the observed historical behavior,
   (ii) R is a recency score based on recency weights of the observed historical behavior, and
   (iii) P is an intercept which is a constant related to click-through rate (CTR),
   and wherein the first buddy nodes are nodes which are in a social network of the node corresponding to the query, and wherein the behavioral targeting score accounts for the one or more identified characteristics;
   updating the behavioral targeting scores of the plurality of first buddy nodes based on:
   using behavioral targeting scores of at least one second buddy node of each first buddy node, wherein a second buddy node of a first buddy node is a node which is in a social network of the first buddy node but not in a social network of the node corresponding to the query, and
   storing web usage history of the user of the node, the web usage history being extracted from a web log corresponding with a user's cookie, and including at least one of queries that were searched, links clicked in the search result, sponsored link clicks, display ad views, display ad clicks, and pages viewed, and modifying the behavioral targeting scores based on the web usage history, the web usage history comprising activities of the user external to internal query responses of the user;

forwarding the query to at least one first buddy node based on the updated behavioral targeting scores;

receiving a response associated with the query; and electronically providing the response to a user of the node.

2. The article of manufacture of claim 1 further comprising instructions operable to cause the programmable processor to perform:

identifying one or more categories associated with the query, the categories including sports, finances, stocks, shares, electronic commerce, entertainments, digital devices, pharmaceutical, automobiles, traveling, hot jobs, and education, and the categories being identified using query categorization techniques.

3. The article of manufacture of claim 1 further comprising instructions operable to cause the programmable processor to perform:

prioritizing the plurality of first buddy nodes based on the updated behavioral targeting scores.

4. The article of manufacture of claim 1 further comprising instructions operable to cause the programmable processor to perform:

sending the query to a second buddy node of the at least one first buddy node.

5. The article of manufacture of claim 1 further comprising instructions operable to cause the programmable processor to perform:

recommending one or more buddies to the user based on the query and behavioral targeting scores of the one or more buddies.

6. A computer-implemented method for context based networking, the computer-implemented method comprising:

receiving a query for nodes in a social network;

identifying characteristics of the query, the characteristics including ambiguity, temporal sensitivity, and spatial sensitivity, and further including authority sensitivity for other than navigational queries;

obtaining behavioral targeting scores of a plurality of first buddy nodes of a node corresponding to the query, wherein the behavioral targeting scores are calculated based on weighted combinations of different metrics observed from historical behavior of the first buddy node, where the behavioral targeting score=I+R+P, where (i) I is an intensity score based on intensity weights of the observed historical behavior, (ii) R is a recency score based on recency weights of the observed historical behavior, and (iii) P is an intercept which is a constant related to click-through rate (CTR), and wherein the first buddy nodes are nodes which are in a social network of the node corresponding to the query, and wherein the behavioral targeting score accounts for the one or more identified characteristics;

updating the behavioral targeting scores of the plurality of first buddy nodes based on:

using behavioral targeting score of at least one second buddy node of each first buddy node, wherein a second buddy node of a first buddy node is a node which is in a social network of the first buddy node but not in a social network of the node corresponding to the query, and storing web usage history of the user of the node, the web usage history being extracted from a web log corresponding with a user's cookie, and including at least one of queries that were searched, links clicked in the search result, sponsored link clicks, display ad views, display ad clicks, and pages viewed, and modifying the behavioral targeting scores based on the web usage history, the web usage history comprising activities of the user external to internal query responses of the user;

forwarding the query to at least one first buddy node based on the updated behavioral targeting scores;

obtaining a response associated with the query; and electronically providing the response to a user of the node.

7. The computer-implemented method of claim 6 further comprising:

identifying the one or more categories associated with the query, the categories including sports, finances, stocks, shares, electronic commerce, entertainments, digital devices, pharmaceutical, automobiles, traveling, hot jobs, and education, and the categories being identified using query categorization techniques.

8. The computer-implemented method of claim 6 further comprising:

prioritizing the plurality of first buddy nodes based on the updated behavioral targeting scores.

9. The computer-implemented method of claim 6 further comprising:

sending the query to a second buddy node of the at least one first buddy node.

10. The computer-implemented method of claim 6 further comprising:

recommending one or more buddies to the user based on the query and behavioral targeting scores of the one or more buddies.

11. A system for context based networking, the system comprising:

a user electronic device in communication with a network connected to a plurality of buddy electronic devices;

a storage unit for storing instructions;

a processor for executing the instructions, the instructions for:

receiving a query for nodes in a social network;

identifying characteristics of the query, the characteristics including ambiguity, temporal sensitivity, and spatial sensitivity, and further including authority sensitivity for other than navigational queries;

obtaining behavioral targeting scores of a plurality of first buddy nodes of a node corresponding to the query, wherein the behavioral targeting scores are calculated based on weighted combinations of different metrics observed from historical behavior of the first buddy node, where the behavioral targeting score=I+R+P, where (i) I is an intensity score based on intensity weights of the observed historical behavior, (ii) R is a recency score based on recency weights of the observed historical behavior, and (iii) P is an intercept which is a constant related to click-through rate (CTR), and wherein the first buddy nodes are nodes which are in a social network of the node corresponding to the query, and wherein the behavioral targeting score accounts for the one or more identified characteristics;

updating the behavioral targeting scores of the plurality of first nodes based on:

using behavioral targeting scores of at least one second buddy node of each first buddy node, wherein a second buddy node of a first buddy node is a node which is in a social network of the first buddy node but not in a social network of the node corresponding to the query; and storing web usage history of the user of the node, the web usage history being extracted from a web log corresponding with a user's cookie, and including at least one of queries that were searched, links clicked in the search result, sponsored link clicks, display ad views, display ad clicks, and pages viewed, and modifying the behavioral targeting scores based on the web usage history, the web usage history comprising activities of the user external to internal query responses of the user;

forwarding the query to at least one buddy node based on the updated behavioral targeting scores;

obtaining a response associated with the query; and electronically providing the response to a user of the node.

* * * * *